United States Patent [19]

McCrum

[11] 4,159,700

[45] Jul. 3, 1979

[54] INTERNAL COMBUSTION COMPOUND ENGINES

[76] Inventor: William H. McCrum, Candlewood Mountain Rd., New Milford, Conn. 06776

[21] Appl. No.: 901,646

[22] Filed: May 1, 1978

Related U.S. Application Data

[63] Continuation-in-part of Ser. No. 734,638, Oct. 18, 1976, Pat. No. 4,086,882.

[51] Int. Cl.² ............................................. F02B 75/20
[52] U.S. Cl. ................................. 123/59 EC; 60/619; 60/620; 123/1 R
[58] Field of Search ................. 123/59 EC, 53 A, 1 R, 123/37, 59 BM, 64; 60/622, 619, 620, 623

[56] References Cited

U.S. PATENT DOCUMENTS

| | | | |
|---|---|---|---|
| 2,196,228 | 4/1940 | Prescott | 123/53 A |
| 3,789,807 | 2/1974 | Pinkerton | 123/59 EC |
| 4,075,980 | 2/1978 | Anger | 123/59 EC |

FOREIGN PATENT DOCUMENTS 0466528  11/1951  Italy ............................................. 60/622

Primary Examiner—Charles J. Myhre
Assistant Examiner—C. R. Feinberg
Attorney, Agent, or Firm—E. Seward Stevens

[57] ABSTRACT

This invention relates to improving the internal combustion and internal use of fuel in reciprocating engines, and more particularly to reciprocating engines which are compounded in order to effect extension of the expansion event of the four-event work cycle of such engines and which are enabled especially thereby to receive and use, for prolonging and substantially improving the combustion process, secondary air inducted and compressed by secondary cylinders of such engines, said air being subsequently applied directly to and into the engine's working medium after the original ignition of each fuel/air charge or any equivalent thereof, and during the power-producing period in which that working medium expands in two coacting cylinders.

3 Claims, 8 Drawing Figures

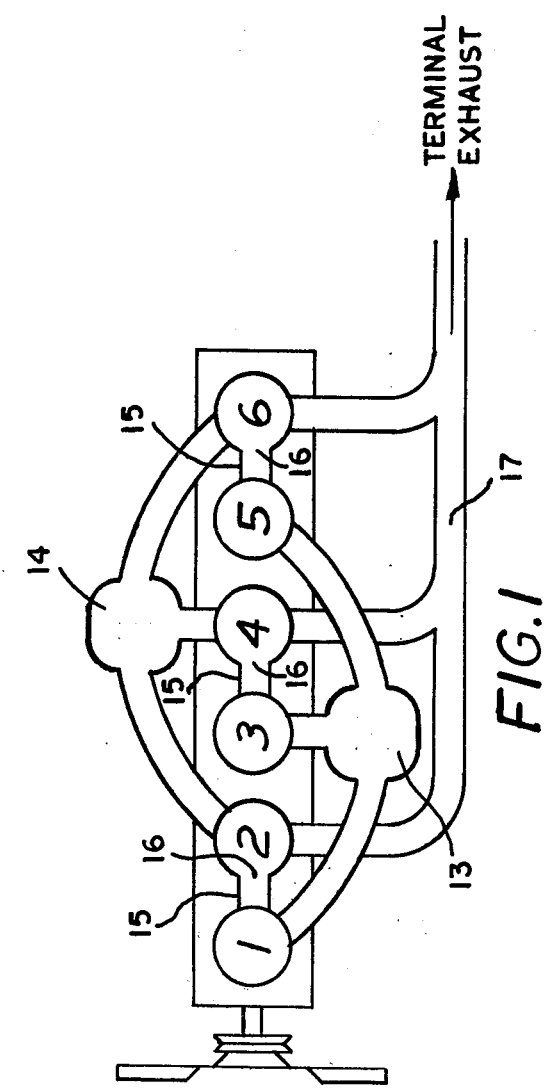

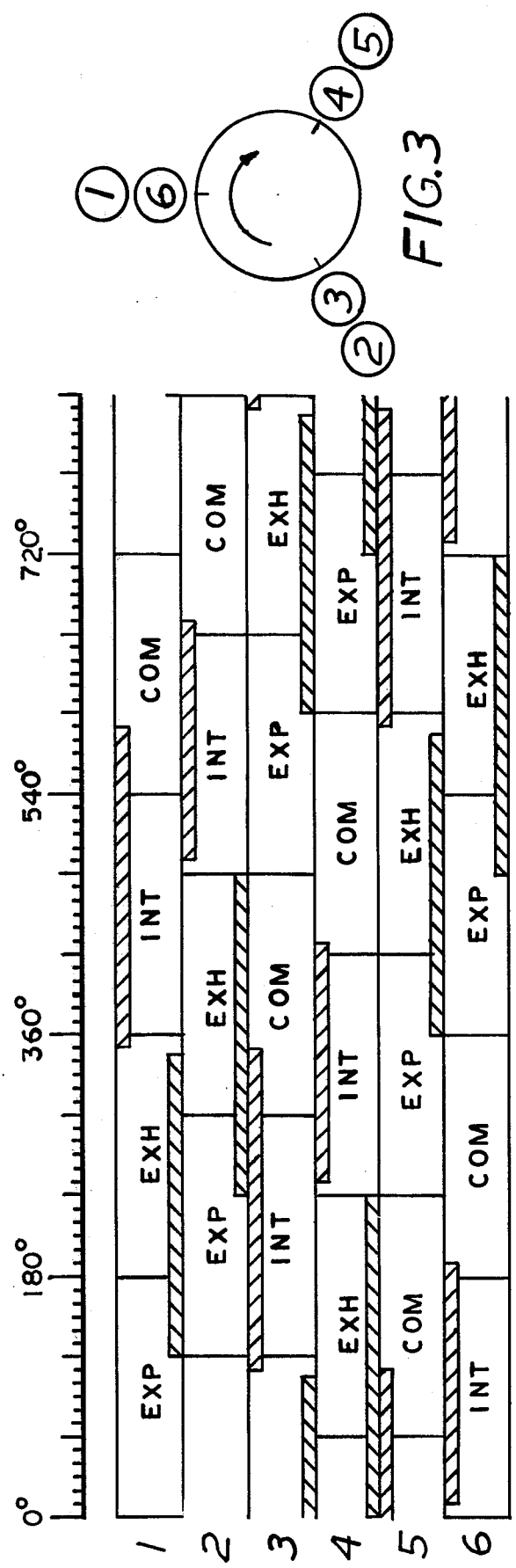
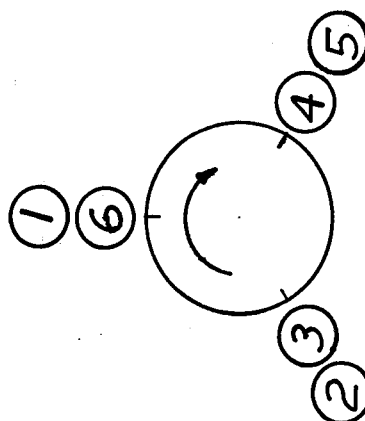
FIG.3
FIG.2

INTERNAL COMBUSTION COMPOUND ENGINES

The objects of compounding such engines using said secondary air are: to reduce fuel consumption by more effective utilization of heat within the engine which results in a gain in power from the combustion of a given amount of fuel; and to effect more complete combustion of the fuel within the engine so as to reduce effectively the quantity of harmful pollutants normally exhausted.

To satisfy the said objectives, I reasoned that engines require the combination of more time, space and air properly applied to the combustion-expansion process.

Therefore, although compound steam engines are not involved with internal combustion of fuel, certain principles of such prior art are employed in a different manner as means to effect extension of the expansion event of my internal combustion engine's work cycle, thereby providing for such engine the said extra time and space for the combustion-expansion process.

Furthermore, as the extension of said expansion event involves the transfer of the engine's working medium from one cylinder to another, I conceived means for adding secondary air to that working medium at the time of said transfer to support combustion of any unburned combustibles therein.

Included in other prior art known to me are five inventions which pertain to internal combustion reciprocating engines somewhat related to the engines of the present invention, but which differ therefrom in operation and/or structure to a considerable degree.

Only the engines of the two earliest of said five inventions (invented prior to 1916) can be said to have operated actually as compound engines, because engine working medium in each primary cylinder was transferred to a coacting secondary cylinder to perform more work during the continued expansion of that medium.

However, in those engines the primary cylinder expansion event overlapped the expansion event of the coacting secondary cylinder a maximum of only 60° of crankshaft rotation, in accordance with the stated arrangement of the crankshaft cranks. Consequently, this limited the extent to which the working medium could be shared between coacting cylinders then undergoing their respective expansion events.

Differently, the present invention provides for substantial extension of said overlapping, enabling certain of the proposed compound engines to provide not only much earlier overlap but much longer periods of overlap of expansion events of coacting cylinders.

In one form of a 12-cylinder engine, said overlap would equate with 120° of crankshaft rotation. An 8-cylinder engine operates with a 90-degree said overlap, and a 6-cylinder engine the minimum 60-degree overlap. Such overlap increases engine torque and improves the engine's power output from a given amount of fuel, as per the subsequent explanation.

Moreover, the compound engines of the present invention utilize secondary air to improve and maximize the internal combustion of the fuel; whereas those earlier compound engines used only the carbureted air inducted and compressed prior to ignition thereof. No secondary air was used by those engines.

The engines of the other three inventions are of the two-stage-combustion type, rather than the compound engine type.

In such engine, the working medium ceases working when it is transferred merely as exhaust from one cylinder to another which then is not acting in its power-producing expansion event. That exhaust is treated by secondary air either enroute or in the receiving cylinder. The resultant mixture is admitted or drawn into that cylinder and is next compressed suitably to be either spark-ignited or compression-ignited, the explosion of that mixture then creating another and different quantity of working medium in that secondary cylinder.

The latter-described method of engine operation is obviously different from that used in the proposed compound engines which provide additional advantages subsequently described.

Of various types and forms of reciprocating engines deemed to be within the scope of this invention, the six-cylinder in-line compound engine arrangement may be regarded as the simplest with respect to structure and operation, details of which are set forth most fully in the following description.

Reference is also made hereinafter to one form of 8-cylinder engine and to 120°-Vee 12-cylinder engine arrangements of the invention.

Although all of these exemplary engines are considered as utilizing a spark-ignition system to initiate primary combustion of the fuel, the invention also encompasses and applies to engines using the compression-ignition system for that same purpose. Referring to the accompanying drawings FIG. 1 is a schematic representation of an in-line 6 cylinder compound engine.

FIG. 2 is a schematic diagram indicating the sequence of the work-cycle events of the engine represented by FIG. 1, and the duration of valve open time for each indicated cylinder and valve.

FIG. 3 indicates crankshaft crank positions of the 6 cylinder compound engine represented by FIG. 1.

FIG. 4 indicates crank positions of a four-crank crankshaft recommended for use in a compound 8-cylinder flat engine, known also as a pancake engine.

Figure 8:
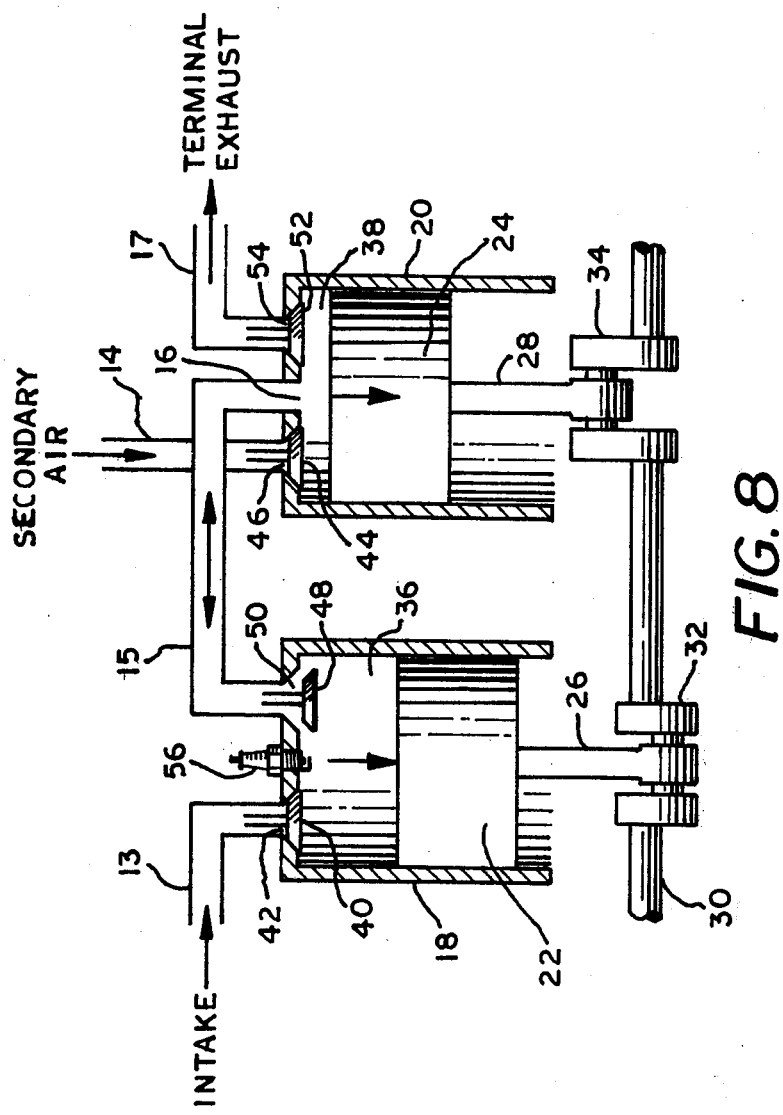

FIG. 8 diagrammatically represents a basic engine unit comprising one primary and one secondary cylinder adjacently disposed and interconnected by a conduit compounding those cylinders to form said unit.

This six-cylinder engine contains three primary cylinders and three secondary cylinders, all operating according to the known four-stroke cycle comprising intake, compression, expansion and exhaust events, respectively. Each cylinder has an intake valve and an exhaust valve.

Only the primary cylinders are provided with a spark ignition system. Those cylinders are numbered 1, 3, 5 on FIG. 1 and operate in conventional manner.

During each intake event, a primary air/fuel charge is inducted by the respective primary cylinder through the conventional intake manifold and fuel/air system 13, which includes a carburetor and air cleaner (not shown).

Three conduits of said system 13 are shown connecting the primary cylinders, the point of connection being the intake port of respective cylinders.

The intake port of each of the secondary cylinders (2,4,6) is similarly connected to a separate manifold 14 serving as a secondary-air supply system, including an air filter (not shown). During the intake event of each secondary cylinder, atmospheric air is drawn through said system 14 and inducted by that cylinder.

Three short conduits 15 are shown on FIG. 1, each conduit separately connecting, and thereby compounding to form an engine unit, one primary and one adjacent secondary cylinder. Preferably, these conduits 15 are in-cylinder-head conduits, cast as integral parts of the cylinder head. Each of these conduits connects the exhaust port of the respective primary cylinder to the combustion chamber of said adjacent secondary cylinder, whereat the conduit 15 ends as a valveless, (constantly-open) port 16.

Such constant opening is schematically picturized on FIG. 1 as the open section or missing part of the "circle" drawn around the cylinder numbers 2, 4, 6. (Where the circle is seen drawn between any cylinder number and any conduit leading to and connecting that cylinder, the presence of a valve is indicated—intake valve governing the intake manifold, and exhaust valve governing the exhaust manifold).

When the exhaust valve of any secondary cylinder opens, the gases in that cylinder are released to the connected exhaust manifold 17 as final exhaust from the engine. That exhaust passes through a conventional exhaust system (not shown) to the atmosphere.

It is observed on FIG. 1 that this 6-cylinder engine comprises three compound engine units consisting of paired cylinders. Cylinders 1 and 2 represent one engine unit; cylinders 3 and 4 form a second unit; and cylinders 5 and 6 the third unit. To effect the subsequently-described coaction between the two cylinders of each said unit, the primary-cylinder exhaust valves in this engine are timed to open 60° BBC.

FIG. 8 schematically typifies one of such compound engine units as would apply to certain spark-ignition engines of this invention.

Cylinder 18 is the primary cylinder of that engine unit, operating as a four-stroke prime mover in conventional manner and according to the said cycle of four events.

During the intake event, piston 22 commences its downstroke, exhaust valve 48 being closed and intake valve 40 open. Primary air/fuel mixture is drawn through said manifold 13 until the intake port 42 is timely closed by valve 40.

The mixture is next compressed during the subsequent upstroke of piston 22. At or near the end of that compression event, said mixture is ignited by a spark from spark plug 56 and a conventional ignition system normally connected thereto. (In other engines according to this invention, fuel would be injected rather than inducted; and in still other engines compression ignition would replace the spark ignition system).

The power-producing expansion event follows as piston 22 undergoes a downstroke, also known as the piston's power stroke.

It is such a power stroke that is picturized in FIG. 8 wherein the working medium, created by the explosion of said mixture in combustion chamber 36, is expanding against piston 22 causing same to rotate crankshaft 30 via the force applied to crank 32 through the connecting rod 26.

It is shown in FIG. 8 that crank 32 is at 60° BBC, having moved 120° from its top dead center (TDC) position in terms of crankshaft rotation. The engine of this particular example calls for exhaust valve 48 to be opened 60° BBC as shown.

Meanwhile, secondary cylinder 20 commenced its four-event cycle 120° later than the start of said primary cycle. During the intake event in cylinder 20, secondary air was drawn through said manifold 14 and intake port 46 past the then-open intake valve 44 and into the combustion chamber 38 by the down-stroke movement of piston 24.

Both exhaust valves 48 and 52 were in closed position during both that intake event and the next compression event in cylinder 20. Thus, the pressurized secondary air in chamber 38 extended also into said conduit 15 via said constantly-open port 16, up to the then-closed exhaust valve 48. The higher-pressured gases then in chamber 36 prevented valve 48 from becoming unseated by the pressured air in conduit 15.

As shown in FIG. 8, piston 24, crank 34 and connecting rod 28 are at TDC position, ready to start the expansion event in cylinder 20. Exhaust valve 52 is closed.

As said exhaust valve 48 opens in the primary cylinder 18, the power-producing working medium at high temperature and pressure attempts to charge into and through the pressured secondary air in conduit 15. Combustion results as unburned burnables in said medium contact said secondary air, itself serving then as part of the working medium. Practically simultaneously, pressures equalize in chambers 36, 38 and in conduit 15, the expansive force of said medium then being applied against both pistons 22 and 24 which participate further in rotating crankshaft 30.

A novel feature of this invention is illustrated by the double-headed arrow shown in conduit 15 of FIG. 8 to indicate flow of said fluids in either direction whenever the primary exhaust valve (such as valve 48) is open. As will be explained subsequently, the direction of said flow depends upon the direction of piston travel and the speed of either piston over that of the other at any given moment. Advantages resulting therefrom will also be explained later, along with other advantages offered by this invention.

Exhaust-to-atmosphere is delayed some 120° of crankshaft rotation per this unit in FIG. 8, thus allowing that air-treated working medium a greatly-increased amount of time to perform its useful work. When crank 34 reaches 60° BBC, exhaust valve 52 will open to allow fluids from chambers 36 and 38 to flow through exhaust port 54 and the said exhaust manifold 17.

One advantage among other advantages of this invention would make it possible for a manufacturer of 6-cylinder in-line engines to convert and transform those engines into compound engines according to FIG. 1 while still retaining much of their original structure. Hence, manufacturing costs should not be unduly increased as a result of the changeover.

The operation of such a 6-cylinder in-line compound engine is described first, together with certain of the structural details. Other details will be added concerning the conversion of the conventional to the compound engine and the differences between same.

This compound engine's operation is perceived easily by referring to FIG. 2 while reading the following explanation.

At the top of FIG. 2, a scale is shown to indicate rotation of the crankshaft in intervals of 10 degrees, drawn to reasonable accuracy for checking description content therewith where desired. Numbers 1 to 6 at the left of FIG. 2 represent the respective cylinders, the four events of each being shown to the right of said numbers.

Legends are shown on FIG. 2 to indicate the respective intake and exhaust valves of the engine, and serve to picturize the described timing of the valves with respect to their opening, closing and open-time duration.

As the engine operates, the expansion event in cylinder 1 is seen starting at 0° on said scale, and effected by the ignition of the compressed fuel-air charge in that cylinder.

At 120° of crank travel per the scale, exhaust valve of cylinder 1 opens to share then the expansion event and the working medium with cylinder 2, said medium passing through said conduit to cylinder 2 which is then commencing its expansion event, thus directly making said event common to both cylinders which then coact.

Simultaneously, cylinder 2 coacts by sharing its previously-inducted, compressed, and heated secondary air with cylinder 1 via the conduit. The very hot working medium then coming into contact with the hot secondary air enables leftover combustibles in said medium to be burned, said air supporting the burning thereof.

According to this invention, each primary cylinder exhaust valve governs the period during which actual coaction occurs between compounded cylinders forming a particular engine unit, the duration of that valve's open time being the measure of said period.

At this point it is worthwhile to read the explanation slowly and visualize, in slow-motion manner, other uncommon effects presumed to occur within this unusual engine.

When cylinder 1 exhaust valve opens, a portion of the hot higher-pressured working medium in cylinder 1 spurts into cylinder 2 and into the lower-pressured secondary air therein, so that gas pressures in both said cylinders may be made equal.

Instantly and practically simultaneously the following occurrences take place: the spurt creates great turbulence in cylinder 2; unburned combustibles in said portion of working medium contact the secondary air, whereby combustion is effected in cylinder 2; this combustion creates a momentary increase of gas pressure in cylinder 2 above that in cylinder 1; that pressure increase and said turbulence tend to force some of the secondary air out of cylinder 2 and into cylinder 1 to equalize the gas pressure; this extends the combustion process in cylinder 1 wherein combustion of unburned combustibles is supported by said secondary air.

Pressures in both cylinders are rapidly equalized as they act on the doubled piston-head area. Additionally, and importantly, crank leverage is simultaneously improved; because while one of the combined cranks is losing its effective leverage angle during the power stroke, the other crank's leverage angle is improving.

Therefore, the combined leverages considerably increase the engine's torque output while only one charge is exploded.

During the period between 120° and 150° per said scale, the speed of piston 1 is greater than that of piston 2. This produces the effect of drawing more secondary air from cylinder 2 into cylinder 1, combustion therein improving accordingly.

Piston speed becomes equal in both cylinders at 150° per scale, when the crank for cylinder 1 reaches 30° BBC with crank for cylinder 2 then at 30° ATC. Throughout the next 90° of crankshaft rotation (150° to 240° on scale), piston speed is faster in cylinder 2 and the crank serving same provides comparatively greater leverage. This enables the working medium to enter cylinder 2 more rapidly and become exposed more to residual secondary air to again further the combustion process and power output.

An uncommon effect occurs during the said 90° period. Even though piston 1 moves into its upward stroke at the 180° mark to transfer the exhaust of cylinder 1 through the exhaust port thereof to cylinder 2, the faster speed of piston 2 offsets the effects of the opposing directions of the two pistons, whereby cylinder 2 is favored in its expansion event.

At the scale's 240° mark, the following important occurrences take place: the expansion event starts similarly in primary cylinder 5 to effect the work output of the compounded cylinders 5 and 6; the exhaust port of cylinder 2 opens (60° BBC as in all secondary cylinders in this engine); and the speed of pistons 1 and 2 is the same.

Between 240° and 330° on the scale, the speed of piston 1 is greater than that of piston 2. Thus, piston 1 rapidly ejects the cylinder 1 exhaust gases into the exhaust system by way of cylinder 2 and the exhaust port thereof. Although in decreasing amount, piston 2 still produces positive and useful work until reaching the 300° mark. Thereafer, piston 2 has an upstroke to exhaust cylinder 2, such event ending at the 480° scale mark whereat the cylinder 2 exhaust valve closes with piston 2 at TDC as cylinder 3 fires its charge.

It is deemed inadvisable to provide "valve overlap" in any cylinder for two reasons. First, the pressure of exhaust gases in compounded cylinders will be somewhat higher than that of conventional engines at the end of the primary cylinder's exhaust event. Overlap would allow said higher pressure to prevent proper induction of the next primary charge, particularly at slow engine speeds. Hence it is recommended that primary exhaust valves close at 15° BTC at which point coaction between compounded cylinders ceases.

Each primary intake valve opens at 10° BTC and closes at 50° ABC, such timing being regarded as conventional and suitable especially for cruising and higher engine speeds. At slow speeds under heavy load conditions, the late closing at said 50° is said to tend to reduce the amount of fuel-air charge inducted, thereby lessening the possibility of detonation occurring in primary cylinders under said conditions.

The second reason for eliminating valve overlap concerns secondary cylinders wherein little or nothing could be gained from said overlap. Sufficient and ample secondary air will be inducted by secondary cylinders at any engine speeds whatever, by having secondary intake valves open at 10° ATC and close 10° ABC.

Such early closing time is particularly recommended to prevent said air from being expelled from secondary cylinders during their compression event, especially when the engine is idling; or running at low RPM; or during stop-and-go driving in heavy traffic. The engine's exhaust is then made cleaner by use of the secondary air thus contained and made available to the combustion process.

From FIG. 2, the total of the engine's work cycle is determinable. FIG. 3 shows crankshaft crank positions applying to the respective cylinders. During rotation, cranks for cylinders 1 and 6 are 120° in advance of cranks for cylinders 2 and 3, which in turn are 120° in advance of the cranks for cylinders 4 and 5. The crankshaft is thus equipped to time the events shown on FIG. 2, whereon primary expansion events are seen to start at 240° intervals. Having the same separation interval, secondary expansion events trail said primary events by 120°.

This compound engine requires the camshaft to provide the described timings for the opening and closing of the engine's intake and exhaust valves.

The ignition system is simplified by the elimination of that service from the secondary cylinders, thus requiring less maintenance attention, adjustment or tune-up.

The carburetor is to be modified to provide combustible air/fuel mixtures richer than stoichiometric to the primary cylinders.

The exhaust manifold is simplified due to its connecting the exhaust ports of only the secondary cylinders. Since the exhaust periods of these cylinders do not overlap, pulsations from exhaust back pressure will not occur.

The engine's cylinder head is replaced by a head cast to contain the three said conduits as integral parts thereof, each conduit being so formed as to connect the primary cylinder's exhaust port to a constantly-open port formed by the conduit at or near the top of the combustion chamber in the secondary cylinder of the same engine unit (each pair of coacting cylinders). Gases are thus enabled to pass rapidly from one to the other cylinder in either direction whenever said primary port is open, and suffer little or no reduction of temperature or pressure while in transit.

The fuel-air intake manifold is modified to eliminate the ducts not needed by secondary cylinders. A special intake manifold is provided to connect the intake ports of secondary cylinders to a preferably separate air-filter system through which the secondary air passes during intake events in secondary cylinders. After being filtered, the secondary air may be subjected to heat before said air enters those cylinders, in order to further improve the combustion process. This air can be passed through a jacket surrounding or placed against the exhaust manifold or pipe.

Consideration should be given to locating each primary-cylinder exhaust valve and port next to and as close as practical to the coacting secondary cylinder. This should effect shortest-possible and even-length conduits, respectively.

Increasing the diameter of the exhaust valve and port of secondary cylinders, and the exhaust passageway leading therefrom to the exhaust system, may be found an effective means for improving exhaust gas flow and cleansing of cylinders. This should coincide with expectations that the engines of this invention will not require in their exhaust systems such an item as a thermal reactor or a catalytic converter to render the engine's exhaust at least as free of pollutants harmful to the enviroment.

Within the scope of this invention, various other engine arrangements can be effected, for example, by increasing the number of engine cylinders so as to have primary-secondary power pulses occur alternately at intervals of 90° as in an eight-cylinder engine; and in other engines at different intervals.

One form of an 8-cylinder engine well-suited for compounding according to this invention is the flat engine having two opposed banks of in-line cylinders, four cylinders per bank. Odd-numbered cylinders are in the left bank of the engine, as viewed from the rear.

Figure 4:
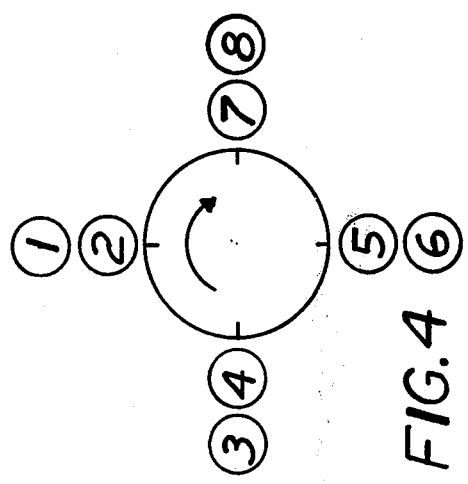

FIG. 4 illustrates the positions of the cranks of the four-crank crankshaft for this engine. As shown viewed from its front end, the crankshaft is seen to rotate in clockwise direction.

The cranks are radially separated by 90-degree angles. In rotation, the crank serving cylinders 1 and 2 is trailed by the crank for 3 and 4, in turn followed by crank for 5 and 6 which is trailed in turn by crank for 7 and 8.

The engine's camshaft is designed and geared to open the exhaust valve of primary cylinders (1, 2, 5 and 6) at 90° BBC; so that at the midpoint of the expansion event of each primary cylinder, the working element in that cylinder is shared by the adjacent conduit-connected secondary cylinder whose piston is then at TDC position are ready to begin the secondary expansion event.

At that same said point of timing, the compressed secondary air in the respective secondary cylinder is applied to and mixed with said shared medium to improve fuel combustion and power output of the engine.

In this 8-cylinder engine, secondary-cylinder exhaust valves open at 45° BBC. All other valve timings remain as previously mentioned.

Ignition means provided only for primary cylinders operate conventionally to effect a firing order of 1-2-6-5 in those cylinders. With the coacting compounded cylinders, that firing order changes to the combustion-expansion order 1-3-2-4-6-8-5-7. This simulates the effects and smoothness of a conventional 8-cylinder engine to some extent, and enables the engine to operate more economically due to the induction of fuel by only four cylinders and the extension of the engine's expansion events during which lengthened time the heat of combustion performs additional work.

For use in large vehicles, for example, a V 12 engine made according to the invention would operate powerfully and economically, fuel being inducted by only six cylinders thereof.

This engine uses two banks of six in-line cylinders, the banks separated by an angle of 120°. Each bank operates in a manner similar to the described six-cylinder engine. Viewed from rear, the left bank contains the odd-numbered cylinders.

Any one of three crankshafts can be used, each having static balance and six cranks disposed to effect expansion events of the six primary cylinders in their firing order 1-10-9-6-5-2 at 120° intervals.

Using one of said three crankshafts having 60-degree angles separating the cranks, the engine will produce alternate primary and secondary expansion events evenly at intervals of 60° of crankshaft rotation. For such an engine arrangement, each primary-cylinder exhaust valve must open 60° ATC (120° BBC). Secondary exhaust valves open 30° BBC. All other valve timings remain as already specified.

It is observed that such arrangement provides a very early overlap of expansion events of compounded cylinders, thus enabling the secondarty-air-treated working medium to act on and drive two pistons in their power-producing direction for a lengthy period of 120° of crankshaft rotation. As previously explained, an improvement in engine torque is obtained thereby from the burning of each fuel/air charge.

Figure 5:
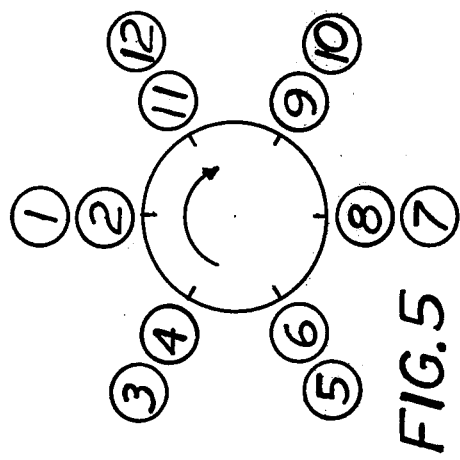
FIG. 5 represents a six-crank crankshaft for a 120°-V 12 engine, the cranks disposed to effect primary and secondary expansion events alternately at 60-degree intervals of crankshaft rotation.

FIG. 5 shows the positions of the crankshaft cranks for this engine which provide then a combustion-expansion order as 1-3-10-12-9-11-6-8-5-7-2-4.

This latter combustion-expansion order is obtained also by using another crankshaft arrangement which effects even intervals between primary expansion events, but uneven intervals between the alternating primary and secondary expansion events.

Figure 6:
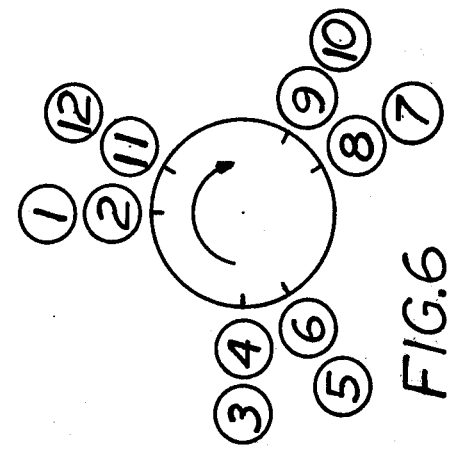
FIG. 6 represents a modification of the FIG. 5 crankshaft, usable in the same said V 12 engine and having each secondary-cylinder crank trail by 90° of crankshaft rotation the crank serving the primary cylinder of the same compound engine unit.

FIG. 6 shows the crank positions of said shaft whereon it is seen that each secondary-cylinder crank trails by 90° the crank serving the primary cylinder of the same compound unit.

Therefore, when the exhaust valve opens 90° BBC in each primary cylinder effecting the sharing of the working medium and the secondary air between the coacting primary and secondary cylinders, the teamed cranks for those cylinders provide maximum-possible crank leverage during the second half of each primary expansion event. Additionally, primary exhaust valves are open approximately no longer than those of conventional engines. It is expected that said uneven events will produce no undesirable effects, such as annoying engine vibrations. For this engine arrangement, it is recommended that secondary exhaust valves open 50° BBC.

Each primary exhaust valve opens 60° BBC as required by a third crankshaft arrangement designed to produce uncommonly effective and desirable results. Having 120-degree angles separating pairs of cranks, this crankshaft provides paired primary and secondary expansion events evenly at intervals of 120°, those simultaneous events alternating between cylinder banks every 120° of crankshaft rotation.

Figure 7:
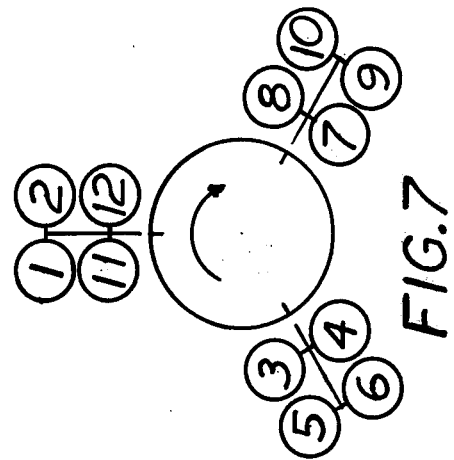
FIG. 7 represents a third type of six-crank crankshaft, usable in the same said V 12 engine to effect simultaneous occurrence of one primary and one secondary-cylinder expansion event at intervals of 120° of crankshaft rotation.

This creates an unusual combustion-expansion order such as 1-3  9-11 5-7 1
10-12 6-8 2-4 which maintains the smoothness of six cylinder engine operation while also balancing the primary-charge explosions alternately between said banks. Moreover, each primary explosion is reinforced by the simultaneous sharing of working medium occurring between coacting cylinders in the opposite cylinder bank, which also tends to maintain smoothness of the engine's operation. FIG. 7 shows the alignment of cranks for this engine arrangement.

The intake of secondary air in such large quantities by these engines, and the unusual manner by which that air is directly exposed to the working medium as it expands during its actual work and power-producing phase, is expected to contribute greatly toward cleansing the exhaust before it leaves the engine and effect a substantial improvement in the engine's use of fuel. Thus, fuel is conserved and the engine produces greater output from a given amount of fuel consumed.

Rich, ignitable fuel-air mixtures exploded in primary cylinders will effect lower high-peak combustion temperatures, whereby less nitrogen oxides are produced. Clean burning of leftover fuel in the engine is assured by the presence of the secondary air copiously supplied by these engines.

The invention is not to be construed as limited to the particular engines and forms disclosed herein, since these are to be regarded as illustrative rather then restrictive, any limitation being to the claimed process and structure and reasonable equivalents.

What I claim is:

1. An internal combustion compound reciprocating engine of the type operating according to the known four-stroke cycle and comprising in combination:

(a) primary cylinders and secondary cylinders arranged alternately in a bank of in-line cylinders, each primary cylinder distinguished from secondary cylinders by serving as a prime mover in conventional manner, and initiating a combustion phase of the engine's operating cycle as an expansion event;

(b) means including a reciprocable piston in each cylinder, a crankshaft, and connecting rods conventionally connecting the respective pistons to said crankshaft for coverting the effects of fuel combustion into propulsive mechanical force as engine output;

(c) means for supplying primary air and fuel only to said primary cylinders and in quantities effecting the equivalent of ignitable fuel-rich mixtures;

(d) means for timely igniting said mixtures in primary cylinders to effect engine working medium;

(e) means including an intake and an exhaust port and valve in each cylinder for effecting and controlling admission, discharge and transfer of gases to, from and between the cylinders, respectively;

(f) gas transfer conduits, each compounding one primary and an adjacent secondary cylinder to form one of the engine's compound units, and particularly connecting the exhaust port of that primary cylinder to a valveless port at and forming part of the combustion chamber of that secondary cylinder, whereby means are provided to which gases are shared between those cylinders during their coaction caused by the conduit-controlling exhaust valve in said primary cylinder via opening said exhaust valve early during the expansion event of that cylinder, and specifically as the secondary-cylinder expansion event commences, so as to effect an early sharing, overlapping, and compounding of those expansion events and a substantial extension of the expansion phase of the engine's operating cycle;

(g) each primary-cylinder exhaust valve serving as means for effecting coaction between compounded cylinders and for controlling the transfer and sharing of gases between said cylinders, the open-time duration of said valve being the total period during which those compounded cylinders coact;

(h) a separate manifold connecting intake valve ports of secondary cylinders to a conventional air filter system through which secondary air is inducted during respective intake events of those cylinders, compressed during successive compression events, respectively, and subsequently mixed with said working medium to support burning of combustibles in that medium as it is shared between coacting compounded cylinders during their combined expansion events;

(i) means for opening and closing said valves in accordance with timing required by the engine's operating cycle events regulated by said crankshaft;

(j) the cranks having crankpins disposed such that there is effected equal spacing of primary-cylinder expansion events, equally-spaced secondary-cylinder expansion events, and alternation of said primary and secondary events in a manner causing a substantial overlap of those events as they occur in and are shared by said coacting compounded cylinders, the minimal duration of said overlap in any engine arrangement equating with 60° of crankshaft rotation; and (k) an exhaust system for transferring the engine's final exhaust from secondary cylinders to the atmosphere.

2. An internal combustion compound reciprocating engine of the type operating according to the known four-stroke cycle and comprising, in combination:

(a) primary cylinders and secondary cylinders, each primary cylinder distinguished from secondary cylinders by serving as a four-cycle prime mover initiating a combustion phase of the engine's operating cycle as an expansion event;

(b) means including a reciprocable piston in each cylinder, a crankshaft, and connecting rods conventionally connecting the respective pistons to said crankshaft for converting the effects of fuel combustion into propulsive mechanical force as engine output;

(c) means for supplying primary air and fuel only to primary cylinders and in quantities effecting the equivalent of ignitable fuel-rich mixtures;

(d) means for timely igniting said mixtures in primary cylinders to effect engine working medium;

(e) means including an intake and an exhaust port and valve in each cylinder for effecting and controlling the admission, discharge and transfer of gases to, from and between the cylinders, respectively;

(f) gas transfer conduits, each connecting and thereby compounding one primary cylinder and only one closely-disposed secondary cylinder whereby means are provided to which gases are intermixed and shared between said cylinders as they are caused to coact by the conduit-controlling exhaust valve in said primary cylinder via opening said exhaust valve early during the expansion event of that cylinder, and as the secondary-cylinder expansion event commences, so as to effect an early sharing, overlapping, and compounding of those expansion events via said conduit and a substantial extension of each expansion phase of the engine's operating cycle;

(g) a separate manifold connecting the intake valve port of each secondary cylinder to a conventional air filter system through which secondary air is inducted during respective intake events of those cylinders, compressed therein during successive compression events, respectively, and subsequently mixed with said working medium during each respective expansion event of those same cylinders to support burning of combustibles in that medium as it is shared between said coacting compounded primary and secondary cylinders during their overlapped expansion events;

(h) means for opening and closing said valves in accordance with timing required by the engine's operating cycle events regulated by said crankshaft;

(i) the crankshaft having cranks disposed such that there is effected equal spacing of the engine's expansion events and alternation of primary and secondary-cylinder expansion events in a manner causing the said overlap of these events occurring in said coacting compounded cylinders; and (j) an exhaust system for transferring the engine's final exhaust from secondary cylinders to the atmosphere.

3. An internal combustion compound engine as in claim 1 wherein the said working medium in each said primary cylinder and the said secondary air in and inducted by the secondary cylinder of the same said engine unit are caused to combine during the expansion events then occurring in both said cylinders, the mixing and union of said fluids being accomplished when the piston in that secondary cylinder is commencing its power stroke in the expansion event of that cylinder and by the respective primary-cylinder exhaust valve then opening to allow flow of said fluids in either direction through said interconnecting conduit, the combining of said fluids serving to effect substantial completion of the internal combustion process with consequential improvement in engine efficiency.

* * * * *

UNITED STATES PATENT AND TRADEMARK OFFICE
CERTIFICATE OF CORRECTION

PATENT NO. : 4,159,700
DATED : July 3, 1979
INVENTOR(S) : William H. McCrum

It is certified that error appears in the above-identified patent and that said Letters Patent are hereby corrected as shown below:

From the front-page section headed "Related U.S. Application Data," delete "Continuation-in-part of Ser. No. 734,638, Oct. 18, 1976, Pat. No. 4,086,882" and insert -- Continuation-in-part of Ser. No. 846,579, Oct. 28, 1977, Pat. No. 4,159,699, Division of Ser. No. 734,638, Oct. 18, 1976, Pat. No. 4,086,882. --.

Column 8, line 24, "element" should read -- medium --.

Column 8, line 27, "are" should read -- and --.

Column 10, line 22, "coverting" should rewd -- converting --.

Column 11, line 4, in paragraph (j), "the cranks having crankpins" should read -- the crankshaft having cranks --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks